No. 760,198. PATENTED MAY 17, 1904.
J. HARGREAVES.
SIDE TOOTH DRESSER FOR SAWS.
APPLICATION FILED JUNE 18, 1902.
NO MODEL.
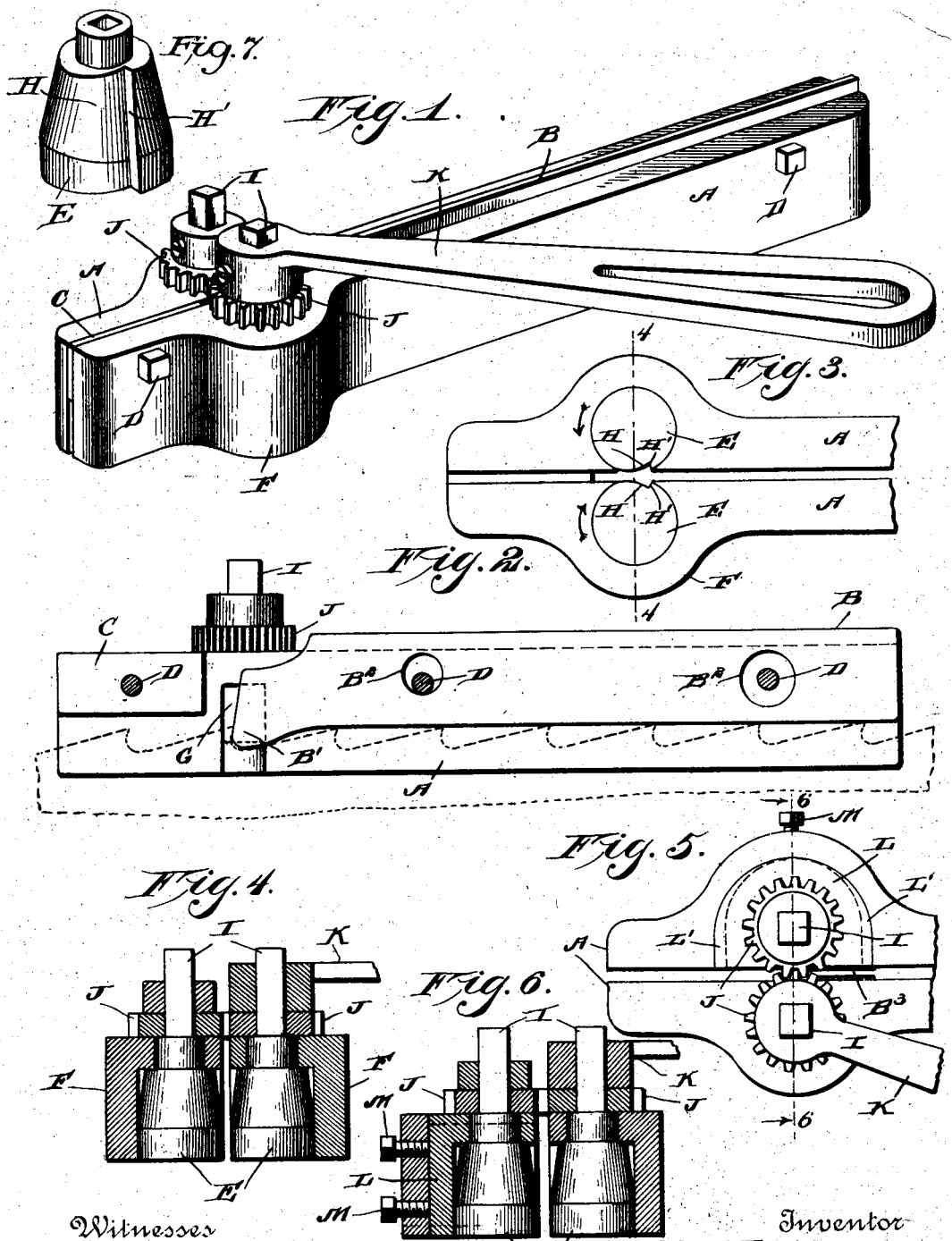

No. 760,198. Patented May 17, 1904.

UNITED STATES PATENT OFFICE.

JOHN HARGREAVES, OF PHILADELPHIA, PENNSYLVANIA.

SIDE-TOOTH DRESSER FOR SAWS.

SPECIFICATION forming part of Letters Patent No. 760,198, dated May 17, 1904.

Application filed June 18, 1902. Serial No. 112,125. (No model.)

*To all whom it may concern:*

Be it known that I, JOHN HARGREAVES, a citizen of the United States, residing at Philadelphia, county of Philadelphia, and State of Pennsylvania, have invented a certain new and useful Improvement in Side-Tooth Dressers for Band and Gang Saws, of which the following is a specification.

My invention relates to a new and useful improvement in side-tooth dressers for band and gang saws, and has for its object to provide an implement of this character which will dress the sides of the saw-teeth uniformly and evenly upon each side after the saw-teeth have been swaged.

With this end in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a perspective view of my invention; Fig. 2, a longitudinal vertical section through the same; Fig. 3, a bottom plan view of the forward or operating portion of the device; Fig. 4, a section taken on the line 4 4 of Fig. 3; Fig. 5, a plan view of the forward or operating part of the device, showing a modification in which one of the rollers is adjustable; Fig. 6, a vertical cross-section on the line 6 6 of Fig. 5. Fig. 7 is a detail view of a roller, showing the cut-away portions in the same.

The non-adjustable construction of the implement, as shown in Figs. 1, 2, 3, and 4, is made of two parts A, which parts are identically the same and are placed face to face and separated by a gage-strip B and a liner C. Bolts D pass horizontally through the two parts and also through the gage-strip and liner and bind these several parts together. E represents two rollers, one journaled vertically in each of the parts A, said parts being enlarged at the point F to form a bearing for these rollers. The bore in the parts A in which the rollers E are journaled is so bored that a portion of the inner face of each of the parts A will be cut away in the boring so as to leave an opening G, and thus the rollers E will project outward into the space between the two parts A; but each of said rollers is cut away, as shown at H, so as to leave a shoulder H' upon each roller, and from the base of this shoulder the cut-away portion merges into the true circle. This cut-away portion H in the rollers tapers from the lower end upward and inward, so as to give the proper shape to the tooth. Thus it will be seen that when the rollers are in the position shown in Fig. 3 the distance between the rollers is the same as the rest of the space between the parts A and the saw can be easily inserted. B is the gage which is clamped between the parts A, and against the nose B' of the gage is adapted to be brought the tooth of the saw to be operated on, and this gage is set so that the teeth will be brought in the proper position to be contacted on each side by the rollers E. The gage is made adjustable by reason of the openings B², through which the bolts D pass, being much larger than said bolts, thus allowing for both longitudinal and lateral movement, so as to make the adjustment universal. C is simply a liner to keep the forward end of the parts A properly separated. The shanks I of the rollers E are squared and extend upward through the implement, and upon the upper ends are secured gears J, which mesh with one another, and upon one of these squared shanks I is placed a wrench-handle K, by which the rollers are designed to be rotated. Thus after the saw has been properly swaged the gage B is set so as to bring the tooth of the saw to the proper point in the implement between the rollers E. Then the rollers are set, as shown in Fig. 3, and the saw inserted between the parts A and the first tooth of the saw is brought against the nose B' of the gage. Then by turning the rollers in the direction of the arrow shown in Fig. 3 the rollers will be brought into contact with the saw-tooth upon each side and roll the excess of the bur formed by the swaging down to the predetermined gage, and the rollers being formed with a taper will give the proper taper to the tooth, so that the tooth will be in the desired shape when ground.

The advantage of this invention is that the tooth of the saw is dressed the same upon each side, so that the saw when used will make an even smooth cut through the wood. In other saw-dressers in which the tooth is dressed by compression the tooth is liable to be dressed more upon one side than the other, so that the saw will make an uneven cut; but in my invention this is impossible.

If it is more desirable to cut the bur from the tooth instead of rolling it, the two rollers E may be transposed, and then by turning the rollers in the direction of the arrow in Fig. 3 the shoulders H' will be brought in contact with the tooth, and these shoulders will form cutting edges to cut the excess bur from the tooth instead of rolling; but I have found by experiment that the rolling is much more preferable, as it rolls the metal forward, so as to give a greater body of metal at the face of the tooth, and the tooth can then be ground several times without again reswaging.

The operation of the device, as shown in Figs. 1, 2, 3, and 4, is as follows: The appliance is placed above the saw, the saw entering the space in between the two halves. One of the teeth coming in contact with the nose B' of the gage-strip B will prevent any movement of the saw when that tooth is being set, as the revolution of the rollers will tend to press the saw against the gage-strip. The rollers E being beveled from the bottom upward and inward, as shown in Fig. 4, will give the desired shape or flare to the tooth, the tooth being previously widened by the swaging process, and the cut-away portion H follows the outline of the roller, and therefore as the rollers are in the position shown in Fig. 3 they do not touch the tooth upon either side; but when the rollers are revolved so as to bring the concentric portion of the rollers against each side of the tooth these rollers will roll the tooth to the desired thickness and shape, and, if desired, the rollers may make one complete revolution; but, as shown in the drawings, one complete revolution could not be made unless the handle K was set up upon the shank I a sufficient distance so that the handle would clear the other shank I in turning; but it does not make any difference whether the rollers make a complete revolution or only a partial one and are brought back with a retrograde movement to the position shown in Fig. 3, and when in such a position the rollers are clear of the saw-teeth upon each side, so that the appliance may be moved to the next tooth.

In Figs. 5 and 6 I have shown a form where one of the rollers is made adjustable laterally, so that in dressing saws of different gage the gage-strip B need not be replaced with a thinner or thicker one, but the same gage-strip can be used and the rollers adjusted. In this form I separate the parts with a gage-strip which is thick enough to accommodate saws of the thickest gage, and I journal one of the rollers E in a separate block L, which is held in one of the parts A. This block L is flanged at L' at the top and bottom to prevent its vertical displacement. M represents set-screws threaded through the side of the part A containing the block L, so that said block can be forced toward the opposite roller when occasion requires. The gage-strip B in this instance is cut away, as illustrated at B³, to allow for the movement of this block L.

As the adjustment from the thinnest to the thickest gage of saws is a very small fraction of an inch, the gears J need not be changed, but the teeth of said gears will be long enough to allow for this adjustment without bringing them out of mesh with one another.

Of course I do not wish to be limited to the exact construction here shown, as slight modifications could be made without departing from the spirit of my invention.

Having thus fully described my invention, what I claim as new and useful is—

1. In a device of the character described, a two-part body divided vertically and longitudinally, a gage-strip clamped adjustably between said parts of the body, two rollers journaled vertically in the body, one roller in each part and arranged opposite one another, cut-away portions in said rollers merging into the true circle of the roller, said rollers tapering from the bottom upward and inward, and means for rotating said rollers simultaneously in opposite directions to one another, as and for the purpose specified.

2. In a device of the character described, a two-part body divided vertically and longitudinally, a gage-strip arranged between the parts of the body and adjustably clamped in place, two tapering rollers journaled vertically in said body, the bore in which said rollers are journaled extending through the inner face of each of the parts of the body so that the true circle of the roller will extend into the space between the parts of the body, cut-away portions in each of the rollers forming an abrupt shoulder and extending from the base of said shoulder and merging into the true circle of the roller, said cut-away portions being such that when brought opposite one another the distance between the rollers will be the same as the rest of the space between the two parts of the body, and means for rotating the two rollers simultaneously and in opposite directions to one another, as and for the purpose specified.

3. In a device of the character described, a two-part body, a gage-strip arranged between the two parts and adjustably clamped in place, a tapering roller journaled vertically in one part of the body, a block fitted in the other part of the body opposite said roller, means for holding said block against vertical displacement, a similar tapering roller journaled vertically in said block directly opposite the first-named roller, vertical cut-away portions formed in each roller, means for rotating the roller simultaneously and in opposite directions to one another, and means for adjusting the block laterally so as to cause it to move toward or away from the fixed roller, as and for the purpose specified.

4. In a device of the character described, a body formed of two parts, a gage-strip clamped adjustably between the parts, a tapering roller journaled vertically in each of said parts and opposite one another and adapted to extend into the slot between the parts when rotated in a certain direction, vertical portions formed in each roller, one of said rollers having a fixed axis, the other roller being adjustable, and means for adjusting said movable roller toward or away from the other roller, and means for rotating both rollers simultaneously and in opposite directions to one another, as specified.

In testimony whereof I have hereunto affixed my signature in the presence of two subscribing witnesses.

JOHN HARGREAVES.

Witnesses:
H. B. HALLOCK,
L. W. MORRISON.